(12) United States Patent
Parker

(10) Patent No.: US 9,996,952 B1
(45) Date of Patent: Jun. 12, 2018

(54) ANALYTIC SYSTEM FOR GRAPHICAL INTERACTIVE B-SPLINE MODEL SELECTION

(71) Applicant: SAS Institute Inc., Cary, NC (US)

(72) Inventor: Ryan Jeremy Parker, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days. days.

(21) Appl. No.: 15/890,841

(22) Filed: Feb. 7, 2018

Related U.S. Application Data

(60) Provisional application No. 62/544,872, filed on Aug. 13, 2017.

(51) Int. Cl.
*G06T 11/20* (2006.01)

(52) U.S. Cl.
CPC .......... *G06T 11/203* (2013.01); *G06T 11/206* (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 7,084,882 B1* | 8/2006 | Dorum | ................... | G01C 21/32 345/589 |
| 7,805,442 B1* | 9/2010 | Joshi | ...................... | G01C 21/32 701/532 |
| 9,111,388 B2* | 8/2015 | Mukai | ................... | G06T 11/203 |
| 2003/0176931 A1* | 9/2003 | Pednault | .......... | G06F 17/30539 700/31 |
| 2009/0060299 A1* | 3/2009 | Hibbard | ................. | G06T 17/30 382/128 |
| 2010/0177103 A1* | 7/2010 | Grandine | ................ | G06F 17/50 345/442 |
| 2013/0030886 A1* | 1/2013 | Poortinga | .......... | G06Q 30/0201 705/14.4 |
| 2014/0046630 A1* | 2/2014 | Smith | ................... | G01J 3/4406 702/179 |

OTHER PUBLICATIONS

C. De Boor, On Calculating with B-Splines, Journal of Approximation Theory 6, 1972, pp. 50-62.

(Continued)

*Primary Examiner* — Xin Sheng

(74) *Attorney, Agent, or Firm* — Bell & Manning, LLC

(57) ABSTRACT

A computing device provides graphical interactive b-spline model selection. A presented criterion fit graph includes a number of internal knots line that indicates a number of internal knots value of a determined best fit b-spline model and a polynomial degree curve for each of a set of polynomial degree values. Each polynomial degree curve shows a fit criterion value as a function of the number of internal knot values. A best fit b-spline model graph is presented next to the presented criterion fit graph that includes a knot location line at each of the knot locations of the determined best fit b-spline model and a best fit model curve computed using the coefficients of the determined best fit b-spline model. An indicator that the number of internal knots line is moved to a different number of internal knots value is received. The best fit b-spline model graph is then updated.

30 Claims, 12 Drawing Sheets

(56) References Cited

OTHER PUBLICATIONS

Zhou et al., Spatially Adaptive Regression Splines and Accurate Knot Selection Schemes, Journal of the American Statistical Association 96:453, Mar. 2001, pp. 247-259.

Yuan et al., Adaptive B-spline knot selection using multi-resolution basis set, IIE Transactions 45:12, Sep. 17, 2012, pp. 1263-1277.

SAS Institute Inc. 2014. SAS/IML® 13.2 User's Guide. Cary, NC: SAS Institute Inc., Aug. 2014.

SAS Institute Inc. 2017. JMP® 13 Fitting Linear Models, Second Edition. Cary, NC: SAS Institute Inc., Feb. 2017.

J. Gallier, Curves and Surfaces in Geometric Modeling Theory and Algorithms, Nov. 7, 2015.

H. J. Bierens, Information Criteria and Model Selection, Mar. 12, 2006.

Lehman et al., Chapter 7: t-Tests: Independent Samples and Paired Samples, JMP® for Basic Univaraite and Multivariate Statistics Methods for Researchers and Social Scientists, Second Edition, Apr. 2013.

A.E. Raftery, A Note on Bayes Factors for Log-Linear Contingency Table Models with Vague Prior Information, Journal of the Royal Statistical Society. Series B (Methodological), vol. 48, No. 2, 1986, pp. 249-250.

He et al., A Data-Adaptive Knot Selection Scheme for Fitting Splines, IEEE Signal Processing Letters 8(5), May 2001, pp. 137-139.

Functional Data Analysis, http://www.psych.mcgill.ca/misc/fda/, Available Oct. 16, 2017.

Fda: Functional Data Analysis, Available Oct. 16, 2017.

\* cited by examiner

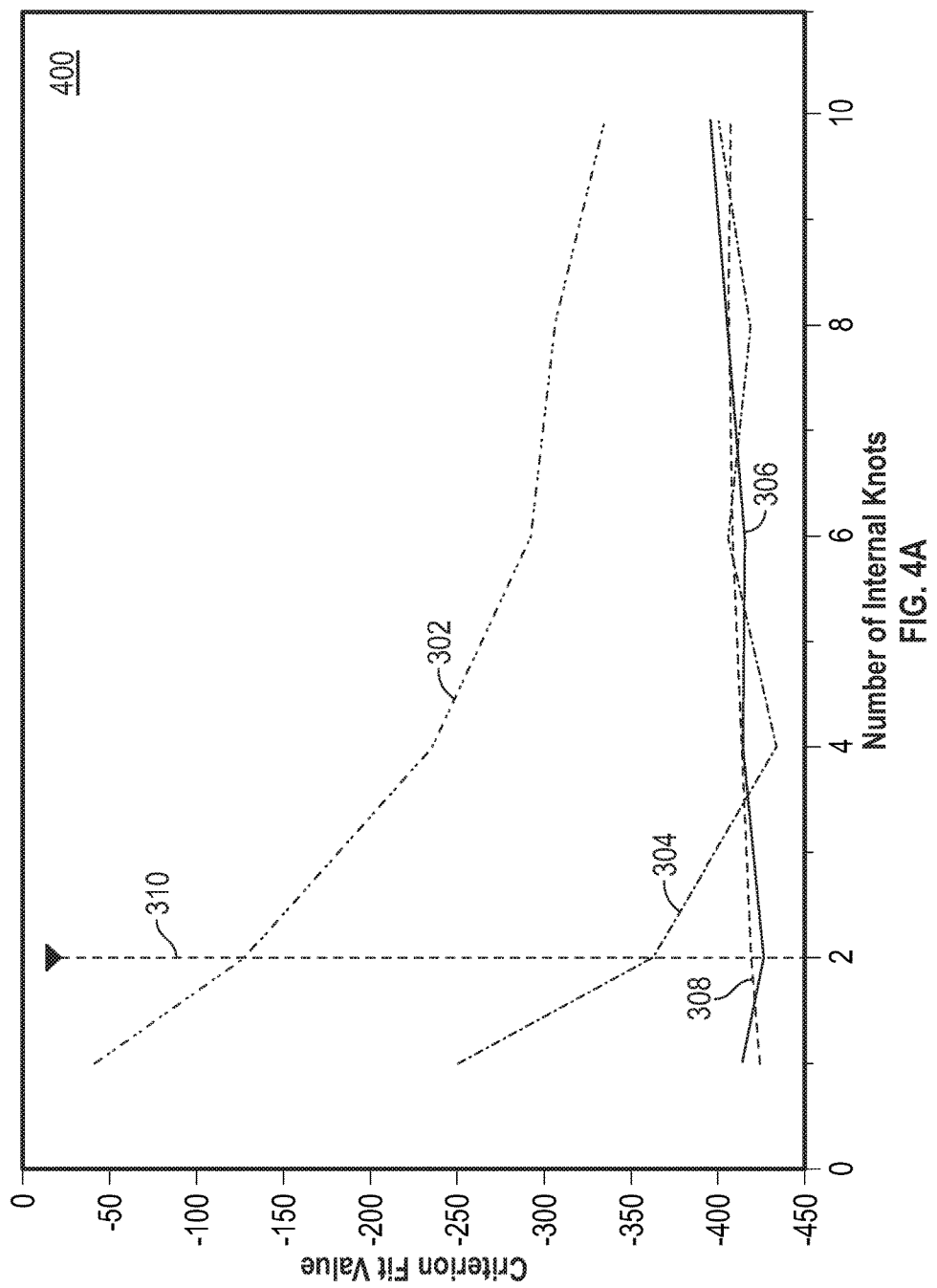

ANALYTIC SYSTEM FOR GRAPHICAL INTERACTIVE B-SPLINE MODEL SELECTION

CROSS-REFERENCE TO RELATED APPLICATIONS

The present application claims the benefit of 35 U.S.C. § 111(e) to U.S. Provisional Patent Application No. 62/544,872 filed on Aug. 13, 2017, the entire contents of which are hereby incorporated by reference.

BACKGROUND

Splines, such as b-splines, are a common tool for modeling non-linear data. There are three parameters that are chosen to fit b-spline models: (1) a number of knots, (2) a location of each knot, and (3) a degree of a polynomial used to fit the data. Iteratively selecting combinations of these parameters requires significant computer resources particularly given that the number of locations that can be evaluated for each knot can be large.

SUMMARY

In an example embodiment, a non-transitory computer-readable medium is provided having stored thereon computer-readable instructions that, when executed by a computing device, cause the computing device to provide interactive b-spline model selection. A dataset that includes a plurality of observation vectors is read. Each observation vector of the plurality of observation vectors includes an explanatory variable value and a response variable value. A first knot location and a last knot location are defined. For each number of internal knots value of a set of internal knot values, a knot location is defined for each internal knot of the respective number of internal knots value, and, for each polynomial degree value of a set of polynomial degree values, a b-spline type model is fit using the first knot location, the last knot location, and the defined knot locations and the respective polynomial degree value, a fit criterion value is computed for the fit b-spline type model that quantifies a goodness of the fit, and the computed fit criterion value, the first knot location, the last knot location, the defined knot locations, the respective polynomial degree value, the respective number of internal knots value, and coefficients are stored to the computer-readable medium. The b-spline type model is further fit to the explanatory variable value and the response variable value of each observation vector of the plurality of observation vectors to define the coefficients that describe a response variable. A best fit b-spline model is determined based on the stored, computed fit criterion value of each fit b-spline type model. A criterion fit graph is presented on a display. The criterion fit graph includes a number of internal knots line that indicates the number of internal knots value of the determined best fit b-spline model and a polynomial degree curve for each polynomial degree value of the set of polynomial degree values. Each polynomial degree curve shows the stored, computed fit criterion value as a function of the set of internal knot values. A best fit b-spline model graph is presented on the display next to the presented criterion fit graph. The best fit b-spline model graph includes a knot location line at each of the knot locations defined for the number of internal knots value of the determined best fit b-spline model and a best fit model curve that is a plot of the response variable value computed as a function of the explanatory variable value using the defined coefficients of the determined best fit b-spline model. An indicator that the number of internal knots line is moved to a different number of internal knots value is received. The knot location for each internal knot is redefined based on the different number of internal knots value. A second best fit b-spline model is determined based on the stored, computed fit criterion value having the different number of internal knots value for the respective number of internal knots value. The presented best fit b-spline model graph is updated to show the knot location line at each of the redefined knot locations and a second best fit model curve that is a second plot of the explanatory variable value computed as a function of the response variable value using the defined coefficients of the determined second best fit b-spline model.

In another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to provide interactive b-spline model selection.

In yet another example embodiment, a method of interactive b-spline model selection is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 3A and 3B, 4A and 4B, and 5A and 5B show a user interface supported by the b-spline model selection application of FIGS. 2A, 2B, and 2C and used to interactively select a b-spline model in accordance with an illustrative embodiment.

DETAILED DESCRIPTION

Figure 1:
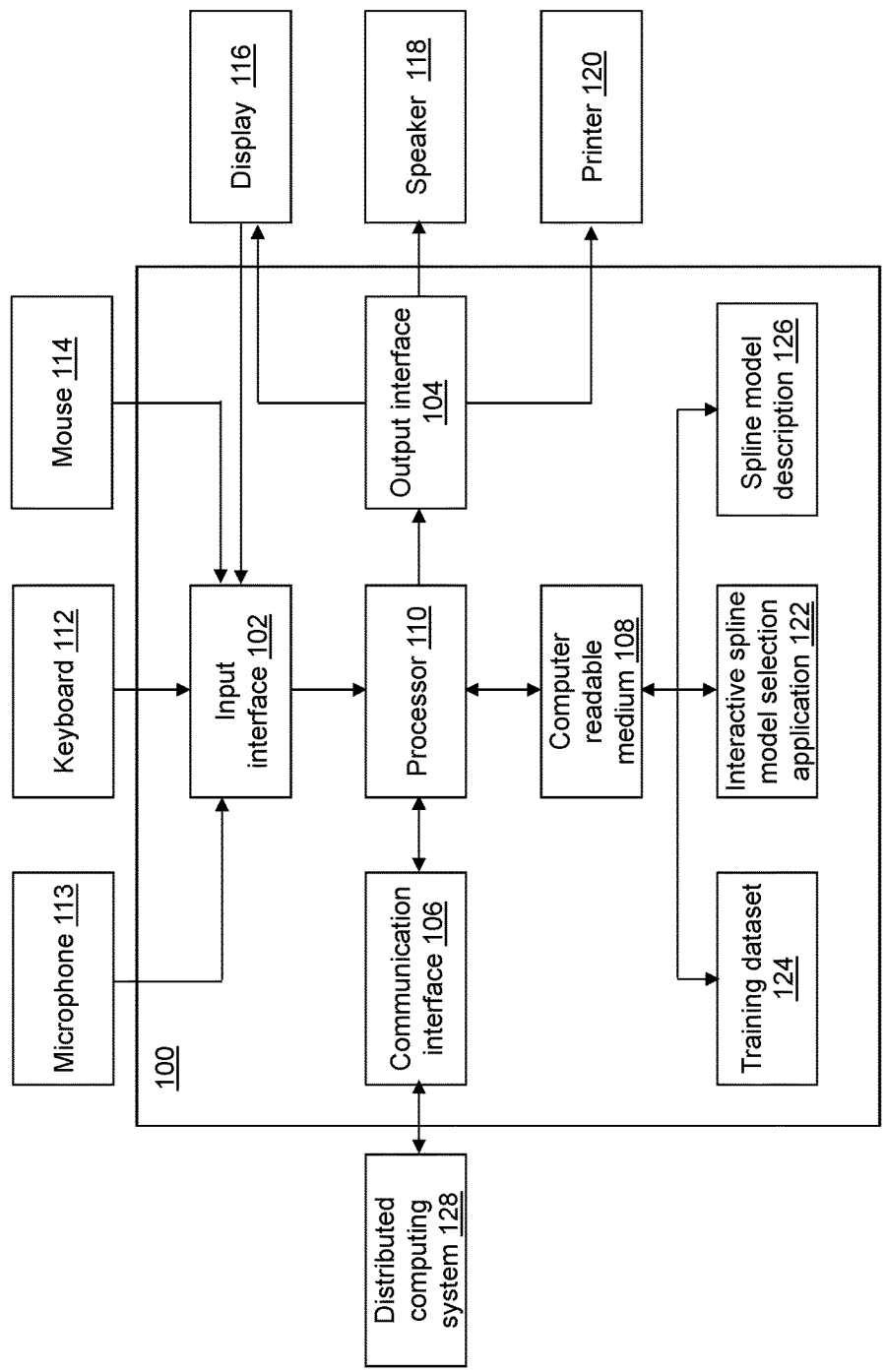
FIG. 1 depicts a block diagram of a b-spline model selection device in accordance with an illustrative embodiment.

Referring to FIG. 1, a block diagram of a b-spline model selection device 100 is shown in accordance with an illustrative embodiment. b-spline model selection device 100 provides interactive b-spline model selection. b-spline model selection device 100 may include an input interface 102, an output interface 104, a communication interface 106, a non-transitory computer-readable medium 108, a processor 110, an interactive b-spline model selection application 122, a training dataset 124, and a b-spline model description 126. Fewer, different, and/or additional components may be incorporated into b-spline model selection device 100.

Input interface 102 provides an interface for receiving information from the user or another device for entry into b-spline model selection device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into b-spline model selection device 100 or to make selections presented in a user interface displayed on display 116.

The same interface may support both input interface 102 and output interface 104. For example, display 116 comprising a touch screen provides a mechanism for user input and for presentation of output to the user. b-spline model selection device 100 may have one or more input interfaces that use the same or a different input interface technology. The input interface technology further may be accessible by b-spline model selection device 100 through communication interface 106.

Output interface 104 provides an interface for outputting information for review by a user of b-spline model selection device 100 and/or for use by another application or device. For example, output interface 104 may interface with various output technologies including, but not limited to, display 116, a speaker 118, a printer 120, etc. b-spline model selection device 100 may have one or more output interfaces that use the same or a different output interface technology. The output interface technology further may be accessible by b-spline model selection device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. b-spline model selection device 100 may have one or more communication interfaces that use the same or a different communication interface technology. For example, b-spline model selection device 100 may support communication using an Ethernet port, a Bluetooth antenna, a telephone jack, a USB port, etc. Data and messages may be transferred between b-spline model selection device 100 and another computing device of distributed computing system 128 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. b-spline model selection device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. b-spline model selection device 100 also may have one or more drives that support the loading of a memory media such as a CD, DVD, an external hard drive, etc. One or more external hard drives further may be connected to b-spline model selection device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc.

Some processors may be central processing units (CPUs). Some processes may be more efficiently and speedily executed and processed with machine-learning specific processors (e.g., not a generic CPU). Such processors may also provide additional energy savings when compared to generic CPUs. For example, some of these processors can include a graphical processing unit (GPU), an application-specific integrated circuit (ASIC), a field-programmable gate array (FPGA), an artificial intelligence (AI) accelerator, a purpose-built chip architecture for machine learning, and/or some other machine-learning specific processor that implements a machine learning approach using semiconductor (e.g., silicon (Si), gallium arsenide (GaAs)) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. b-spline model selection device 100 may include a plurality of processors that use the same or a different processing technology.

Figure 6:
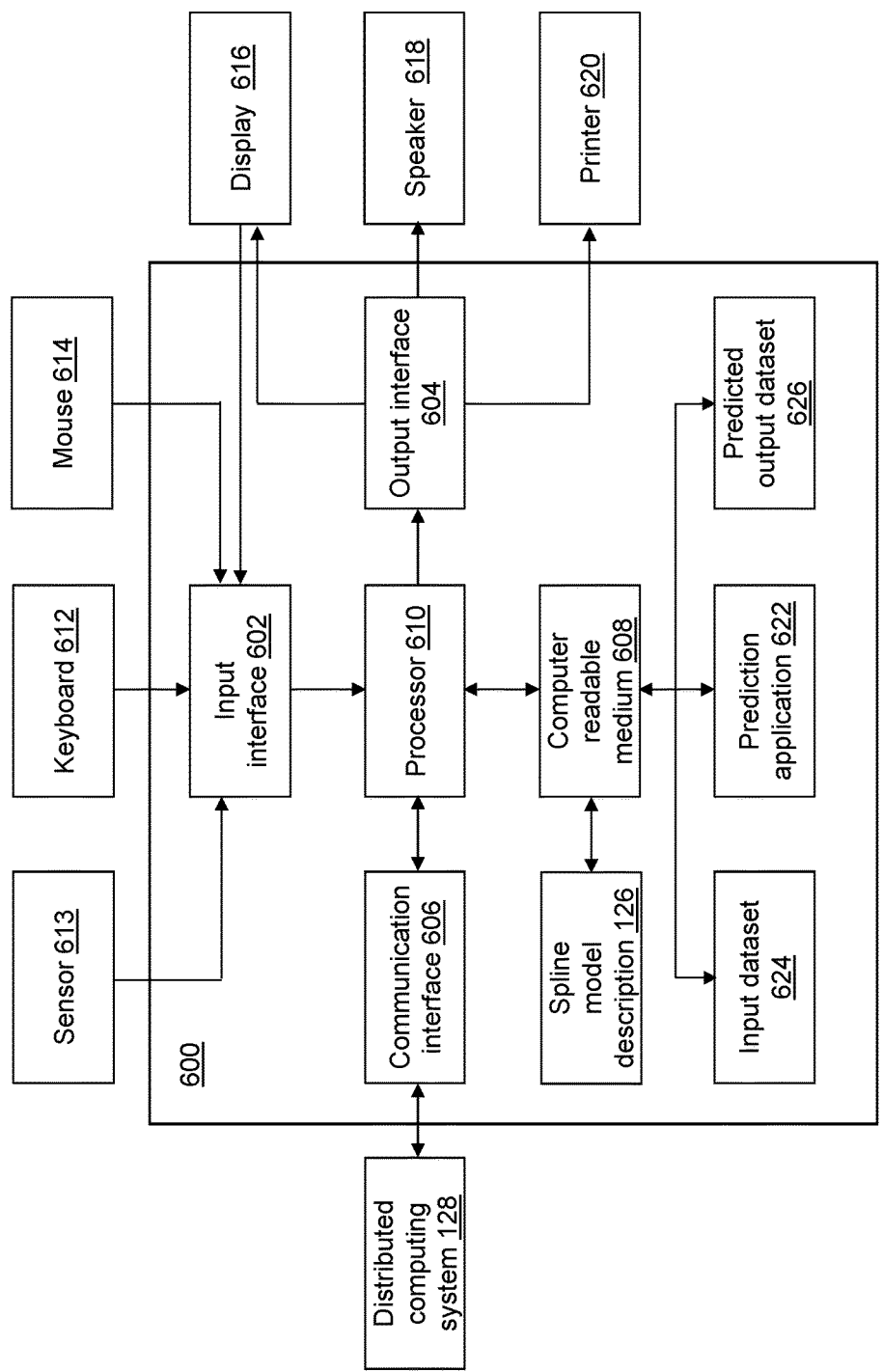
FIG. 6 depicts a block diagram of a prediction device that uses the selected b-spline model to predict a result in accordance with an illustrative embodiment.

Interactive b-spline model selection application 122 performs operations associated with defining b-spline model description 126 from data stored in training dataset 124 and with allowing the user of b-spline model selection device 100 to interactively select the b-spline model input parameters. b-spline model description 126 may be used to predict a response variable value for data stored in an input dataset 624 (shown referring to FIG. 6). Some or all of the operations described herein may be embodied in interactive b-spline model selection application 122. The operations may be implemented using hardware, firmware, software, or any combination of these methods.

Interactive b-spline model selection application 122 is easy to use and provides approximately instantaneous feedback so that the user can quickly and efficiently change a location of one or more knots interactively. Alternative solutions require the user to specify the exact locations of all knots, while Interactive b-spline model selection application 122 allows the user to easily change all or any subset of the default locations as needed.

Referring to the example embodiment of FIG. 1, interactive b-spline model selection application 122 is implemented in software (comprised of computer-readable and/or computer-executable instructions) stored in computer-readable medium 108 and accessible by processor 110 for execution of the instructions that embody the operations of interactive b-spline model selection application 122. Interactive b-spline model selection application 122 may be written using one or more programming languages, assembly languages, scripting languages, etc. Interactive b-spline model selection application 122 may be integrated with other analytic tools. As an example, interactive b-spline model selection application 122 may be part of an integrated data analytics software application and/or software architecture such as that offered by SAS Institute Inc. of Cary, N.C., USA. Merely for illustration, interactive b-spline model selection application 122 may be implemented using or integrated with one or more SAS software tools such as JMP®, Base SAS, SAS® Enterprise Miner™, SAS/STAT®, SAS® High Performance Analytics Server, SAS® Visual Data Mining and Machine Learning, SAS® LASR™ SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML® all of which are developed and provided by SAS Institute Inc. of Cary, N.C., USA. Data mining, statistical analytics, and response prediction are applicable in a wide variety of industries to solve technical problems.

Interactive b-spline model selection application 122 may be implemented as a Web application. For example, interactive b-spline model selection application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Training dataset 124 may include, for example, a plurality of rows and a plurality of columns. The plurality of rows may be referred to as observation vectors or records (observations), and the columns may be referred to as variables. In an alternative embodiment, training dataset 124 may be transposed. The plurality of variables may include a response variable Y and one or more explanatory variables that define an explanatory vector X for each observation vector. Training dataset 124 may include additional variables that are not the response variable Y or one of the explanatory variables. An observation vector is defined as $(y_i, x_i)$ that may include a value for each of the response variable Y and the explanatory variables associated with the observation vector i. One or more variables of the plurality of variables may describe a characteristic of a physical object. For example, if training dataset 124 includes data related to operation of a vehicle, the variables may include an oil pressure, a speed, a gear indicator, a gas tank level, a tire pressure for each tire, an engine temperature, a radiator level, etc. Training dataset 124 may include data captured as a function of time for one or more physical objects.

The data stored in training dataset 124 may be generated by and/or captured from a variety of sources including one or more sensors of the same or different type, one or more computing devices, etc. The data stored in training dataset 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

In data science, engineering, and statistical applications, data often consists of multiple measurements (across sensors, characteristics, responses, etc.) collected across multiple time instances (patients, test subjects, etc.). These measurements may be collected in training dataset 124 for analysis and processing.

Training dataset 124 may be stored on computer-readable medium 108 or on one or more computer-readable media of distributed computing system 128 and accessed by b-spline model selection device 100 using communication interface 106, input interface 102, and/or output interface 104. Data stored in training dataset 124 may be sensor measurements or signal values captured by a sensor, may be generated or captured in response to occurrence of an event or a transaction, generated by a device such as in response to an interaction by a user with the device, etc. The data stored in training dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in training dataset 124 may be captured at different time points periodically, intermittently, when an event occurs, etc. One or more columns of training dataset 124 may include a time and/or date value.

Training dataset 124 may include data captured under normal operating conditions of the physical object. Training dataset 124 may include data captured at a high data rate such as 200 or more observation vectors per second for one or more physical objects. For example, data stored in training dataset 124 may be generated as part of the Internet of Things (IoT), where things (e.g., machines, devices, phones, sensors) can be connected to networks and the data from these things collected and processed within the things and/or external to the things before being stored in training dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in training dataset 124.

Training dataset 124 may be stored using various data structures as known to those skilled in the art including one or more files of a file system, a relational database, one or more tables of a system of tables, a structured query language database, etc. on b-spline model selection device 100 or on distributed computing system 128. b-spline model selection device 100 may coordinate access to training dataset 124 that is distributed across distributed computing system 128 that may include one or more computing devices. For example, training dataset 124 may be stored in a cube distributed across a grid of computers as understood by a person of skill in the art. As another example, training dataset 124 may be stored in a multi-node Hadoop® cluster. For instance, Apache™ Hadoop® is an open-source software framework for distributed computing supported by the Apache Software Foundation. As another example, training dataset 124 may be stored in a cloud of computers and accessed using cloud computing technologies, as understood by a person of skill in the art. The SAS® LASR™ Analytic Server may be used as an analytic platform to enable multiple users to concurrently access data stored in training dataset 124. The SAS®Viya™ open, cloud-ready, in-memory architecture also may be used as an analytic platform to enable multiple users to concurrently access data stored in training dataset 124. SAS® Cloud Analytic Services (CAS) may be used as an analytic server with associated cloud services in SAS® Viya™ Some systems may use SAS In-Memory Statistics for Hadoop® to read big data once and analyze it several times by persisting it in-memory for the entire session. Some systems may be of other types and configurations.

A b-spline model models a mean behavior of Y given an explanatory variable X. For illustration, a b-spline model can be computed using the TRANSREG, PRINQUAL, and GLIMMAX procedures implemented by SAS/STAT software, using in the adaptivereg action implemented by SAS Viya software, or the BSPLINE function of SAS/IML® software.

Figure 2A:
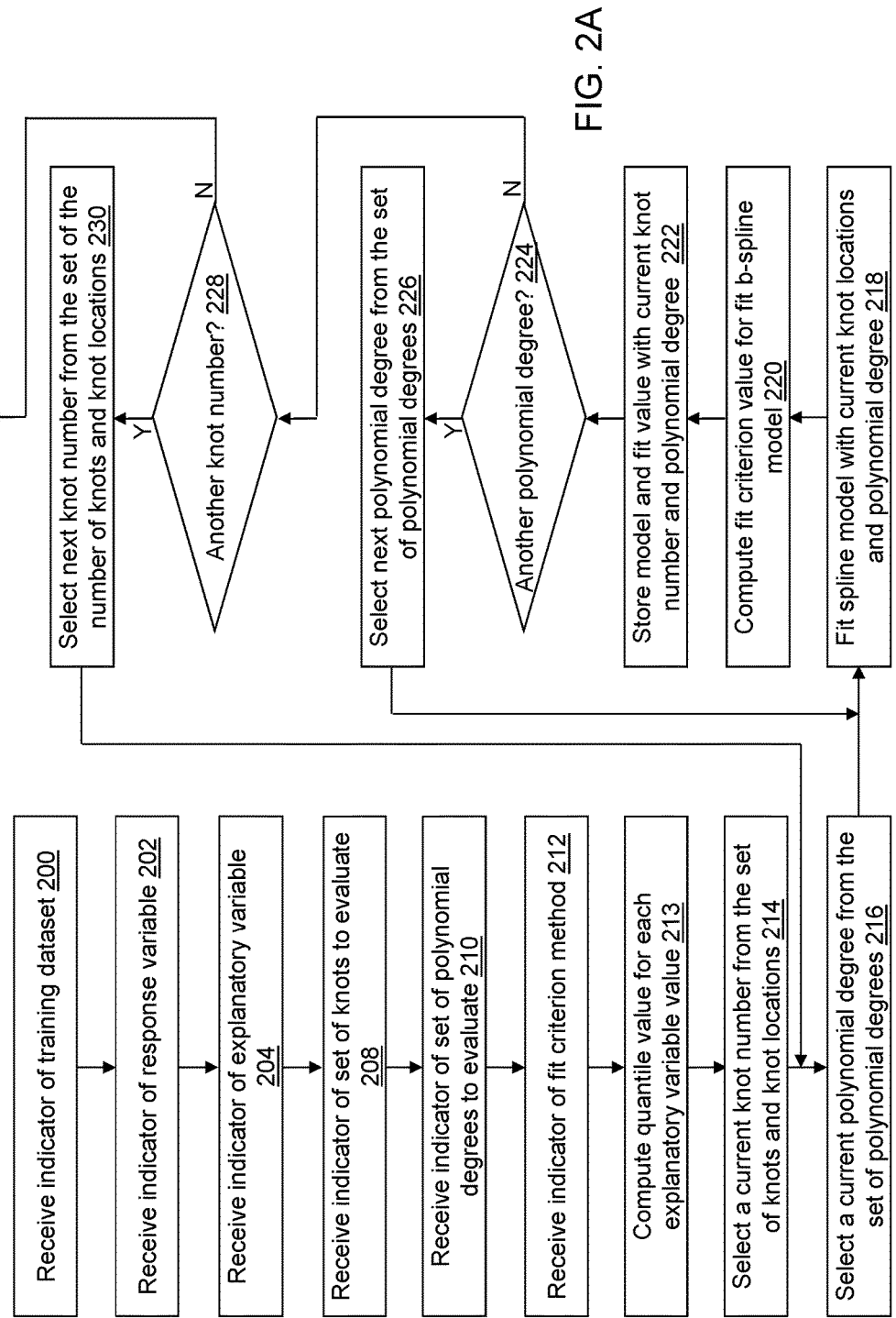
FIGS. 2A, 2B, and 2C depict a flow diagram illustrating examples of operations performed by a b-spline model selection application of the b-spline model selection device of FIG. 1 in accordance with an illustrative embodiment.
Figure 2B:
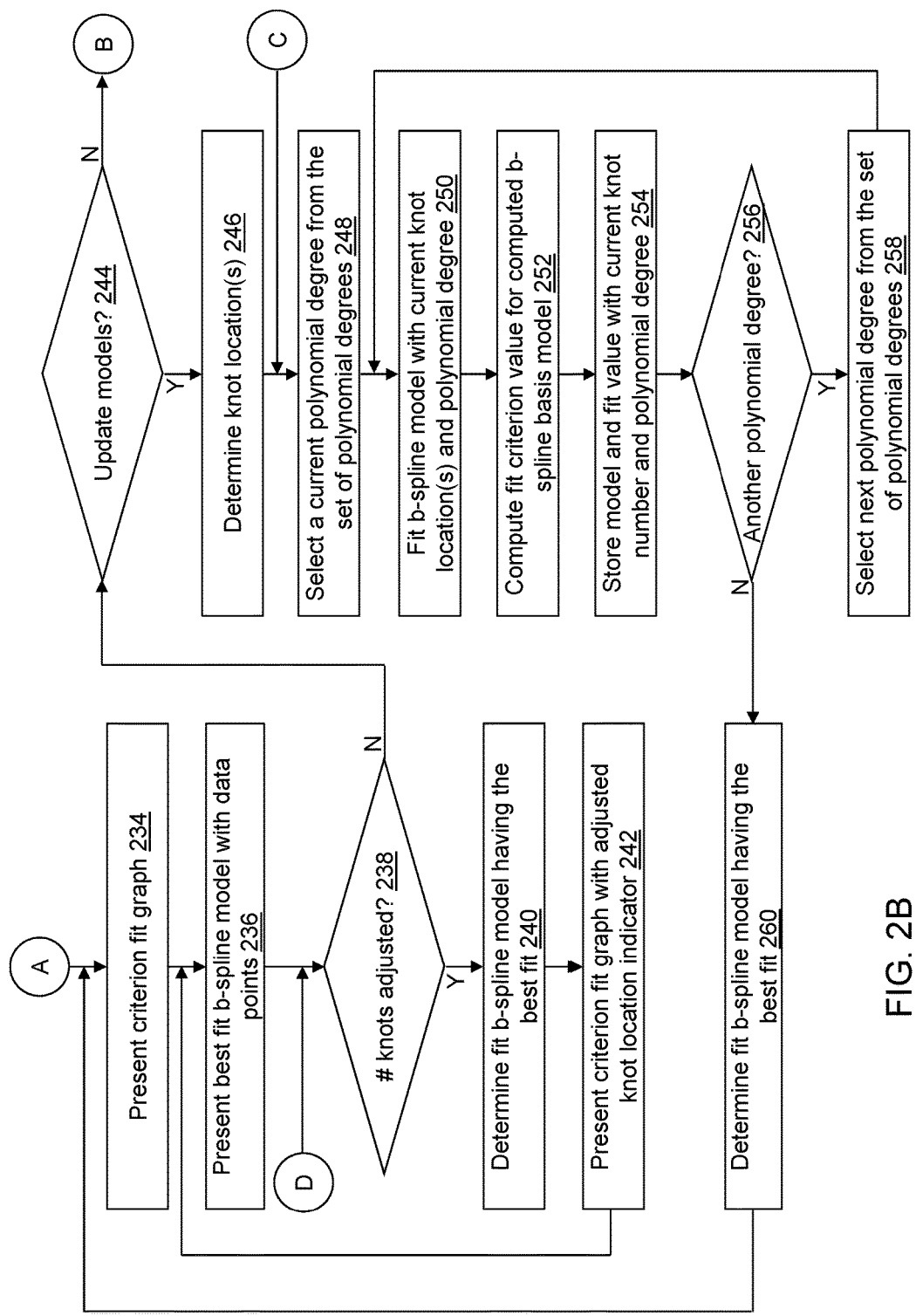
Figure 2C:
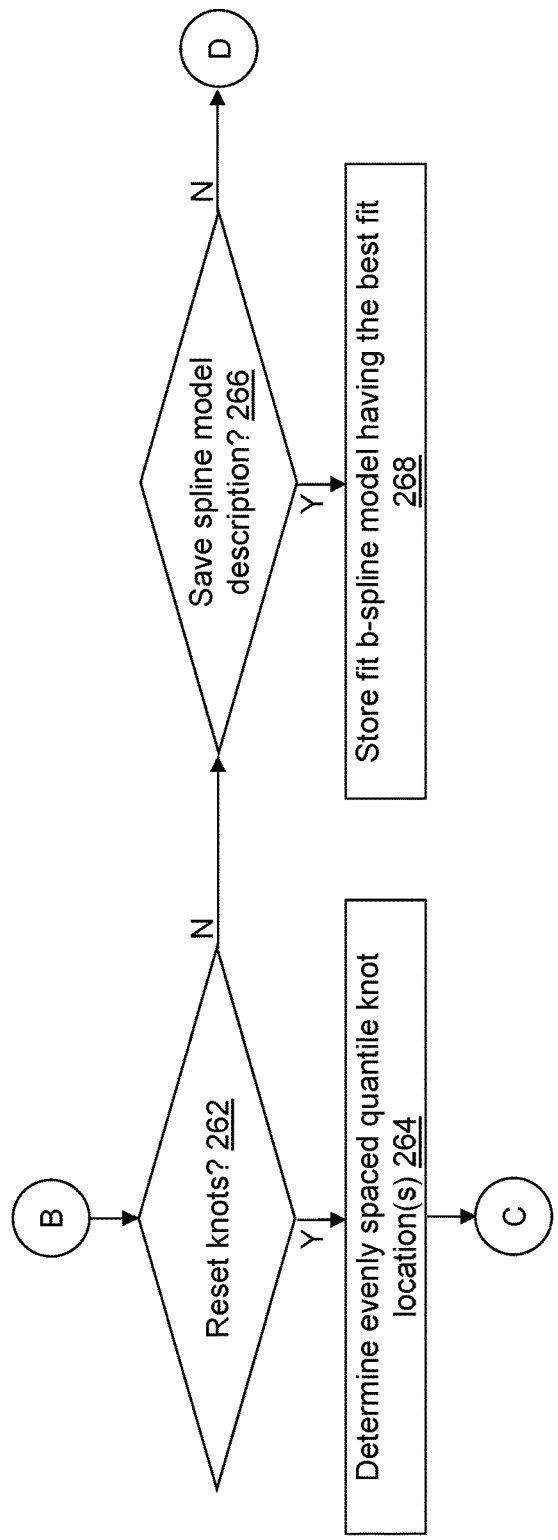

Referring to FIGS. 2A, 2B, and 2C, example operations associated with interactive b-spline model selection application 122 are described. Additional, fewer, or different operations may be performed depending on the embodiment of interactive b-spline model selection application 122. The order of presentation of the operations of FIGS. 2A, 2B, and 2C is not intended to be limiting. Some of the operations may not be performed in some embodiments. Although some of the operational flows are presented in sequence, the various operations may be performed in various repetitions, concurrently (in parallel, for example, using threads and/or a distributed computing system), and/or in other orders than those that are illustrated. For example, a user may execute interactive b-spline model selection application 122, which causes presentation of a first user interface window, which may include a plurality of menus and selectors such as drop-down menus, buttons, text boxes, hyperlinks, etc. associated with interactive b-spline model selection application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by interactive b-spline model selection application 122.

Referring to FIG. 2A, in an operation 200, a first indicator may be received that indicates training dataset 124. For example, the first indicator indicates a location and a name of training dataset 124. As an example, the first indicator may be received by interactive b-spline model selection application 122 after selection from a user interface window or after entry by a user into a user interface window. In an alternative embodiment, training dataset 124 may not be selectable. For example, a most recently created dataset may be used automatically.

In an operation 202, a second indicator may be received that indicates response variable Y in training dataset 124. For example, the second indicator may indicate a column number or a column name. As another option, a first or a last column of training dataset 124 may be assumed to be the response variable Y column.

In an operation 204, a third indicator may be received that indicates an explanatory variable X in training dataset 124. For example, the third indicator may indicate a column number or a column name. As another option, a first or a last column of training dataset 124 may be assumed to be the explanatory variable X column.

In an operation 208, a fourth indicator of a set of a number of internal knots to evaluate using the B-spline type model may be received. For example, a minimum number of internal knots, a maximum number of internal knots, and a number of internal knots increment may be selected or defined by a user. As another option, a user entered list of the number of knots to evaluate is received. In an alternative embodiment, the fourth indicator may not be received. For example, default values for the set of knots may be stored, for example, in computer-readable medium 108 and used automatically. For illustration, the set of knots to evaluate may include $N_{IK} = \{1, 2, 3, \ldots, 10\}$ number of internal knots that is used by default unless the user selects a different set of values for $N_{IK}$. An "exterior" knot is at an end point, primarily to handle the differences between polynomial degrees equal to 0, 1, 2, 3, etc. It is common to select these end points over the range of training dataset 124. This means there are $N_{EK} = D+1$ number of external knots where D is a polynomial degree at the location corresponding to a minimum and to a maximum over the range of training dataset 124. For example, $N_{EK} = 4$, for a cubic (D=3) polynomial degree. The total number of knots is then $N_{TK} = 2N_{EK} + N_{IK}$. The set of knots includes only the internal knots. The set of knots need not be in numerical order.

In an operation 210, a fifth indicator of a set of polynomial degrees to evaluate using the B-spline type model may be received. For example, a minimum polynomial degree and a maximum polynomial degree may be selected or defined by a user. In an alternative embodiment, the fifth indicator may not be received. For example, default values for the set of polynomial degrees may be stored, for example, in computer-readable medium 108 and used automatically. For illustration, the set of polynomial degrees to evaluate may include $N_D = \{0, 1, 2, 3\}$ that is used by default unless the user selects a different set of values for $N_D$. The set of polynomial degrees need not be in numerical order.

In an operation 212, a sixth indicator may be received that indicates a fit criterion method to use to estimate a quality of or a goodness of a fit of each b-spline model to paired values of the explanatory variable X and the response variable Y read from training dataset 124. For example, the sixth indicator indicates a name of a fit criterion method. The sixth indicator may be received by interactive b-spline model selection application 122 after selection from a user interface window or after entry by a user into a user interface window. A default value for the fit criterion method may further be stored, for example, in computer-readable medium 108. As an example, a fit criterion method may be selected from "BIC", "AIC", "GCV", "Robust GCV", "AICc", etc. For example, a default fit criterion method may be indicated by "BIC", which indicates a Bayesian information criterion method, by "AIC", which indicates an Akaike (AIC) information criterion method, by "GCV", which indicates a generalized cross-validation (GCV) information criterion method, by "Robust GCV", which indicates a robust GCV information criterion method, by "AICc", which indicates a corrected AIC information criterion method, etc. Of course, the fit criterion method may be labeled or selected in a variety of different manners by the user as understood by a person of skill in the art. In an alternative embodiment, the fit criterion method may not be selectable, and a single fit criterion method is implemented by interactive b-spline model selection application 122. For example, the fit criterion method indicated as "BIC" may be used by default or without allowing a selection.

In an operation 213, a quantile value is computed for each explanatory variable value read from input dataset 124. For example, the RANK procedure implemented by Base SAS software can be used to compute the quantile values. For example, by specifying a GROUPS=100 option, percentile rank values can be computed for each explanatory variable value read from input dataset 124. In an alternative embodiment, the quantile value may not be computed.

In an operation 214, a current number of knots $N_{CK}$ is selected from the set of knots $N_{IK}$. Again, the current number of knots $N_{CK}$ is a number of internal knots. For example, a first number of knots is selected from the set of knots $N_{IK}$. The internal knot locations are chosen by selecting knots located at evenly spaced quantiles of the explanatory variable values read from training dataset 124 based on the current number of knots $N_{CK}$, where a first external knot location is also defined at quantile level zero and a last external knot location is also defined at quantile level one. A first external knot associated with the first external knot location and a last external knot associated with the last external knot location are not included in the current number of knots $N_{CK}$. In an alternative embodiment, evenly spaced values of for each explanatory variable value read from input dataset 124 are used to define the knot locations.

In an operation 216, a current polynomial degree $N_{CD}$ is selected from the set of polynomial degrees $N_D$. For example, a first polynomial degree is selected from the set of polynomial degrees $N_D$.

In an operation 218, a b-spline model is fit to the pairs of the response variable value and the quantile value computed for each explanatory variable value of each observation vector read from training dataset 124 using the current number of knots $N_{CK}$ and the current polynomial degree $N_{CD}$ and based on the B-spline type model. The b-splines are piecewise polynomials defined based on the current polynomial degree $N_{CD}$ and that are continuous at each internal knot location except when $N_{CD}$=0.

In an operation 220, a criterion fit value is computed for the fit b-spline model based on the fit criterion method selected in operation 212. Coefficients that describe the computed b-spline model may be saved in computer-readable medium 108 in association with the current number of knots $N_{CK}$ and the current polynomial degree $N_{CD}$.

In an operation 222, coefficients that describe the fit b-spline model and the computed criterion fit value may be stored in computer-readable medium 108 in association with the current number of knots $N_{CK}$ and the current polynomial degree $N_{CD}$.

In an operation 224, a determination is made concerning whether there is another polynomial degree of the set of polynomial degrees to evaluate. When there is another polynomial degree, processing continues in an operation 226. When there is not another polynomial degree, processing continues in an operation 228. For example, a polynomial degree counter may be used to index into the set of polynomial degrees, and a value of the polynomial degree counter may be used to indicate whether there is another polynomial degree of the set of polynomial degrees to evaluate.

In operation 226, a next polynomial degree is selected from the set of polynomial degrees $N_D$ as the current polynomial degree $N_{CD}$, and processing continues in operation 218 to fit the b-spline model using the next polynomial degree.

In operation 228, a determination is made concerning whether there is another number of knots of the set of knots $N_{IK}$ to evaluate. When there is another number of knots, processing continues in an operation 230. When there is not another number of knots, processing continues in an operation 232. For example, a number of knots counter may be used to index into the set of knots $N_{IK}$, and a value of the number of knots counter may be used to indicate whether there is another number of knots of the set of knots $N_{IK}$ to evaluate.

In operation 230, a next number of knots is selected from the set of knots $N_{IK}$ as the current number of knots $N_{CK}$, and processing continues in operation 214 to fit the b-spline model using the next number of knots with the set of polynomial degrees $N_D$.

In operation 232, a b-spline model having the best fit is determined from the stored criterion fit values. For example, a minimum criterion fit value may be identified from the stored criterion fit values, and the associated knot number $N_{BFK}$ and the associated polynomial degree $N_{BFD}$ may be selected with the associated coefficients to describe the best fit b-spline model. In alternative embodiments, a maximum criterion fit value may indicate the best fit b-spline model.

Figure 3A:
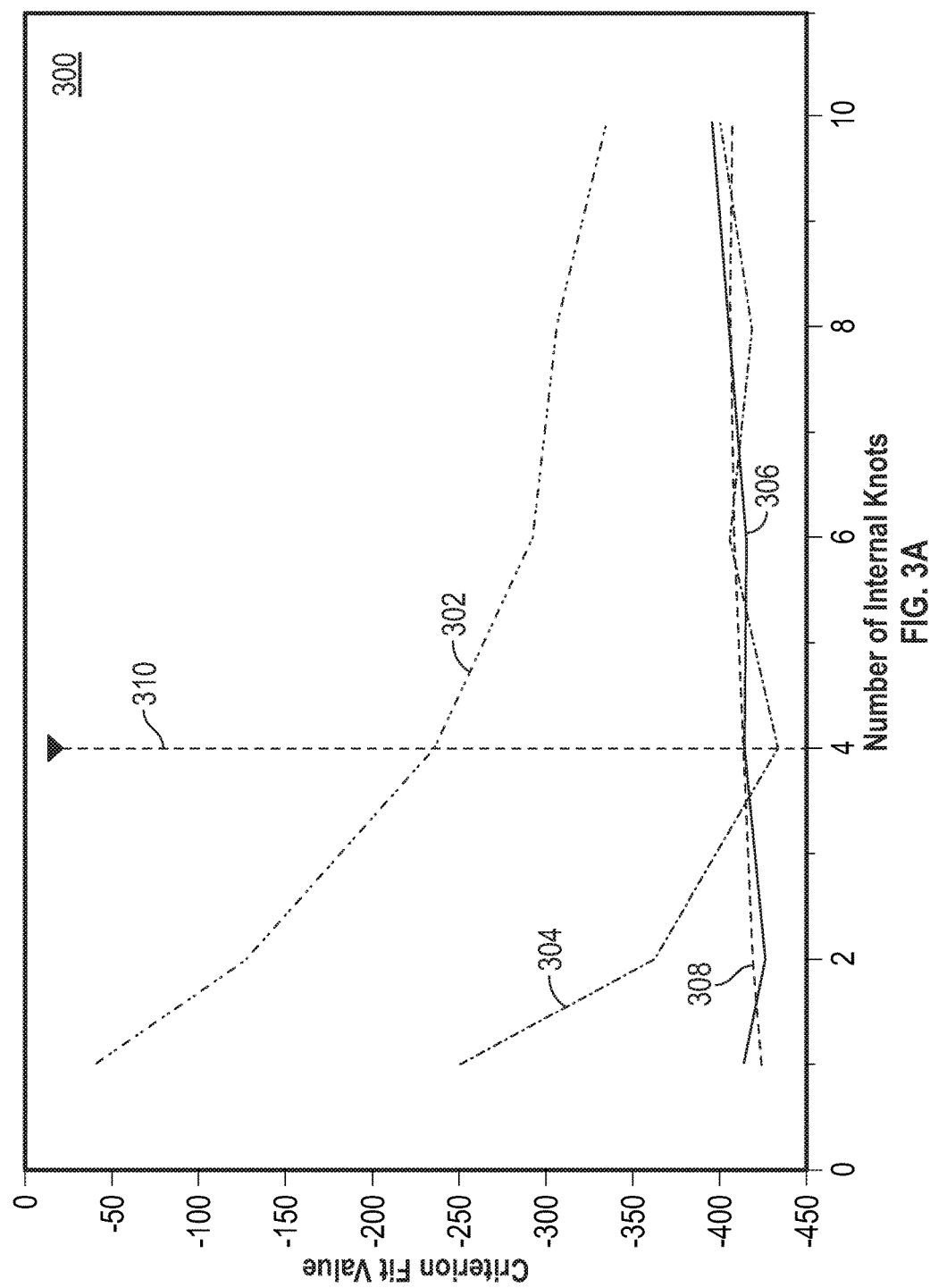

Referring to FIG. 2B, in an operation 234, a criterion fit graph is presented in display 116. For example, referring to FIG. 3A, a criterion fit graph 300 is presented in a user interface window of interactive b-spline model selection application 122 on display 116. An x-axis of criterion fit graph 300 is the number of internal knots. A y-axis of criterion fit graph 300 is the criterion fit value. Criterion fit graph 300 includes a curve defined for each polynomial degree of the set of polynomial degrees $N_D$. For example, for $N_D$={0, 1, 2, 3}, a first curve 302 shows the criterion fit value as a function of the number of internal knots for $N_D$=0; a second curve 304 shows the criterion fit value as a function of the number of internal knots for $N_D$=1; a third curve 306 shows the criterion fit value as a function of the number of internal knots for $N_D$=2; a fourth curve 308 shows the criterion fit value as a function of the number of internal knots for $N_D$=3. A number of internal knots line 310 indicates the number of internal knots of the b-spline model having the best fit. In the illustrative example presented in FIG. 3A, the b-spline model having the best fit is provided by $N_D$=1 as indicated by second curve 304 such that $N_{BFK}$=4 and $N_{BFD}$=$^1$.

Figure 3B:
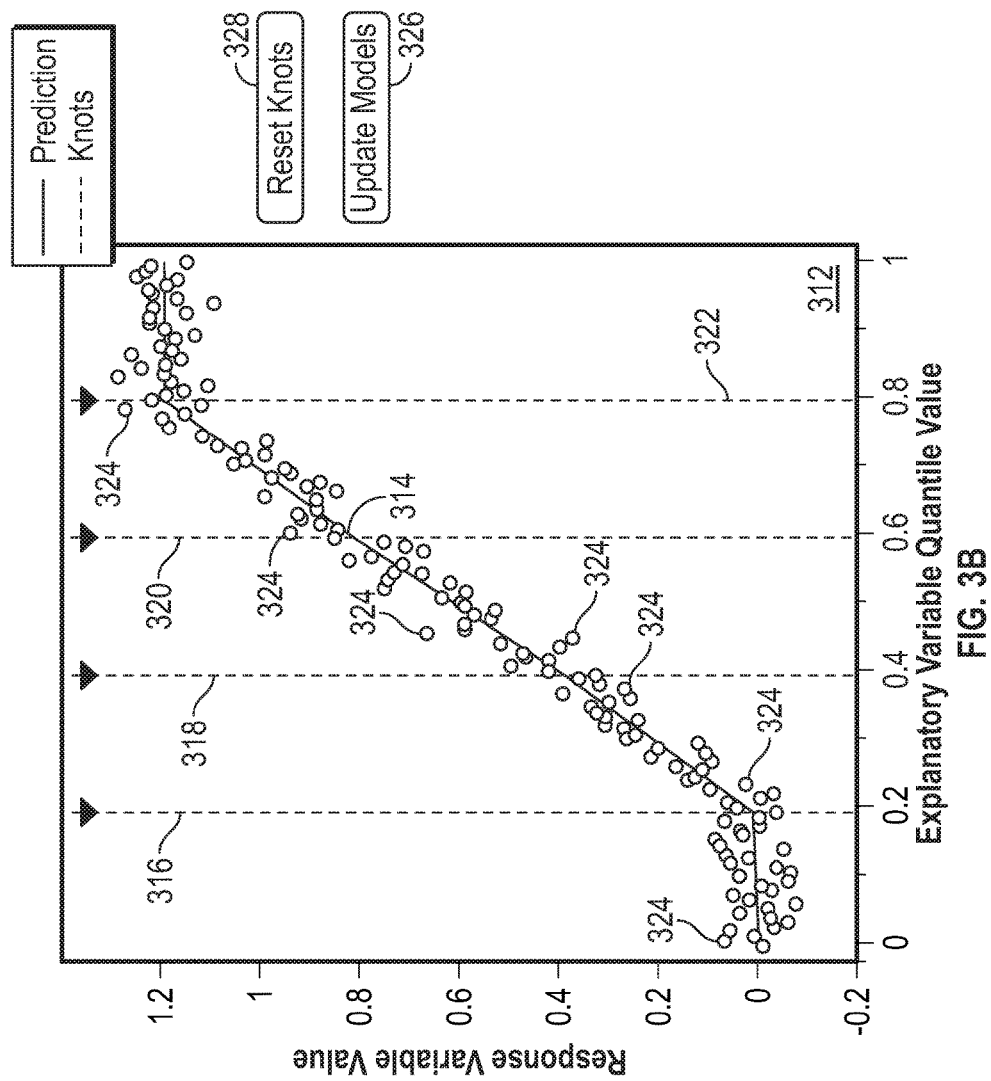

Referring again to FIG. 2B, in an operation 236, a best fit b-spline model graph is presented in display 116. For example, referring to FIG. 3B, a best fit b-spline model graph 312 is presented in the user interface window of interactive b-spline model selection application 122 on display 116. For illustration, criterion fit graph 300 and best fit b-spline model graph 312 may be presented simultaneously and side by side in the same user interface window. An x-axis of best fit b-spline model graph 312 is the explanatory variable quantile value. A y-axis of best fit b-spline model graph 312 is the response variable value. A best fit model curve 314 is a plot of the response variable value as a function of the explanatory variable quantile value, wherein the response variable value is computed using the coefficients that describe the best fit b-spline model.

Best fit b-spline model graph 312 includes a knot location line defined for each internal knot location determined at the evenly spaced quantiles of the explanatory variable values read from training dataset 124 based on the associated knot number $N_{BFK}$. In the illustrative example of best fit b-spline model graph 312, $N_{BFK}=4$, as shown by number of internal knots line 310. As a result, a first internal knot location line 316 shows a first quantile value at 0.2; a second internal knot location line 318 shows a second quantile value at 0.4; a third internal knot location line 320 shows a third quantile value at 0.6; and a fourth internal knot location line 322 shows a fourth quantile value at 0.8.

Best fit b-spline model graph 312 further includes scatter plot points 324 overlaid on best fit model curve 314. Scatter plot points 324 include a symbol for each pair of the response variable value and the quantile value computed for each explanatory variable value of each observation vector read from training dataset 124. Scatter plot points 324 provide a visual indication of the distribution of the data relative to the best fit b-spline model.

The user interface window further includes an update models button 326 and a reset knobs button 328 described below. After presentation of criterion fit graph 300 and best fit b-spline model graph 312, a user may slide number of internal knots line 310 right or left, may slide internal knot location line 316, 318, 320, 322 (based on the number of internal knot locations) right or left, and/or may select update models button 326 or reset knobs button 328. As understood by a person of skill in the art, interactive b-spline model selection application 122 receives indicators of the user's interactions with the user interface window and responds based on the received indicator to update criterion fit graph 300 and best fit b-spline model graph 312.

Referring again to FIG. 2B, in an operation 238, a determination is made concerning whether the number of internal knots line 310 is slid right or left by the user to adjust the number of internal knots. When the number of internal knots is adjusted, processing continues in an operation 240. When the number of internal knots is not adjusted, processing continues in an operation 244. For example, interactive b-spline model selection application 122 receives an indicator of where the number of internal knots line 310 is dropped to define a new value for the current number of knots $N_{CK}$ based on the user interaction.

In operation 240, a b-spline model having the best fit based on the new value for the current number of knots $N_{CK}$ is determined from the stored criterion fit values. For example, a minimum criterion fit value may be identified from the stored criterion fit values based on the new value for the current number of knots $N_{CK}$, and the polynomial degree $N_{BFD}$ may be selected with the coefficients associated with the best fit b-spline model having the current number of knots $N_{CK}$.

Figure 4B:
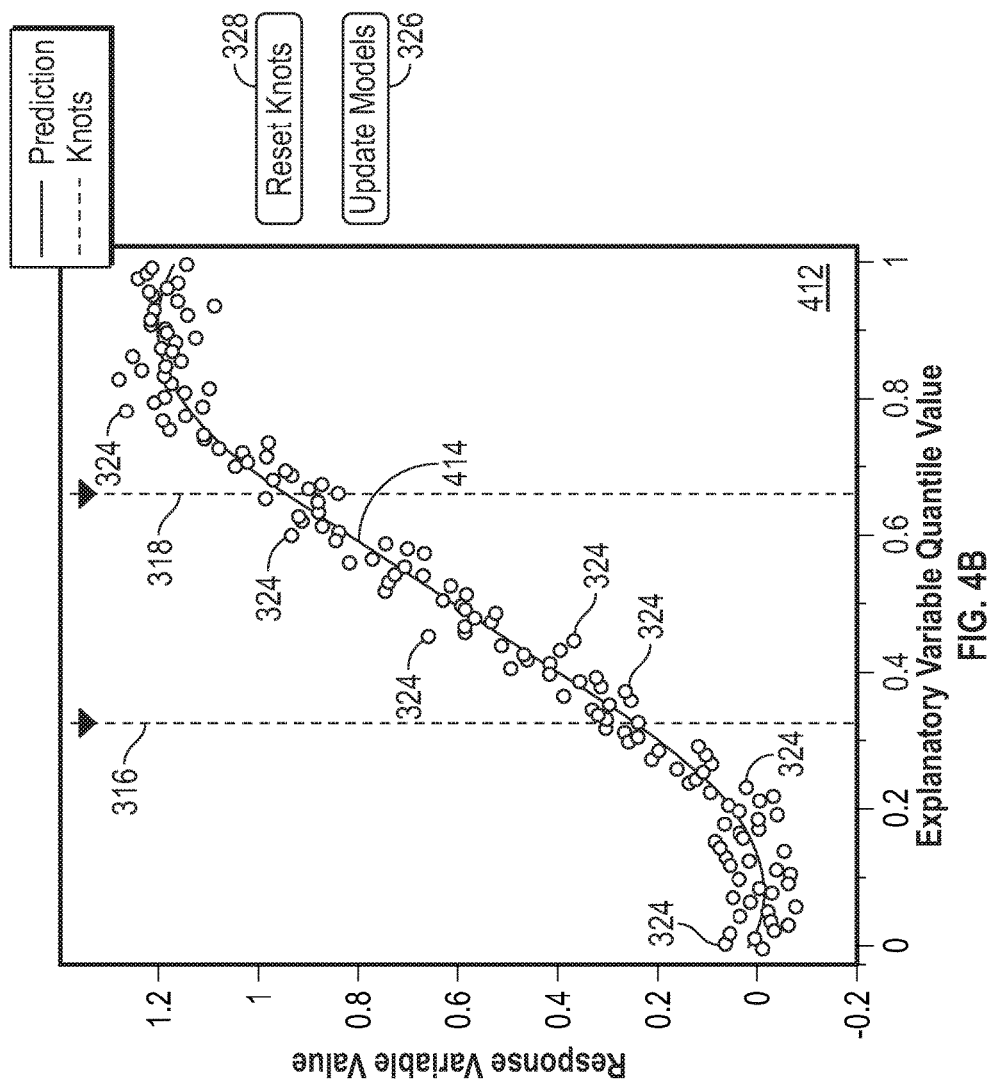

In an operation 242, a criterion fit graph associated with the new value for the current number of knots $N_{CK}$ is presented in display 116. For example, referring to FIG. 4A, a second criterion fit graph 400 is presented in the user interface window of interactive b-spline model selection application 122 on display 116. Second criterion fit graph 400 is identical to criterion fit graph 300 except that number of internal knots line 310 has been moved to indicate the new value for the current number of knots $N_{CK}=2$. The b-spline model having the best fit is provided by $N_{BFD}=2$ as indicated by third curve 306. Processing continues in operation 236 to update the best fit b-spline model graph presented in display 116. For example, referring to FIG. 4B, a second best fit b-spline model graph 412 is presented in the user interface window of interactive b-spline model selection application 122 on display 116 in response to $N_{CK}=2$. A second best fit model curve 414 is a plot of the response variable value as a function of the explanatory variable quantile value using $N_{CK}=2$, the associated polynomial degree $N_{BFD}=2$, and the associated coefficients that describe the b-spline model for $N_{CK}=2$ and $N_{BFD}=2$.

Second best fit b-spline model graph 412 includes a knot location line defined for each internal knot location determined at the evenly spaced quantiles of the explanatory variable values read from training dataset 124 based on $N_{CK}=2$. As a result, first internal knot location line 316 shows a first quantile value at 0.33, and second internal knot location line 318 shows a second quantile value at 0.66.

In operation 244, a determination is made concerning whether update models button 326 is selected by the user to update the b-spline models based on one or more new locations of the internal knots. When update models button 326 is selected, processing continues in an operation 246. When update models button 326 is not selected, processing continues in an operation 262. For example, interactive b-spline model selection application 122 receives an indicator that the user has selected update models button 326.

Figure 5A:
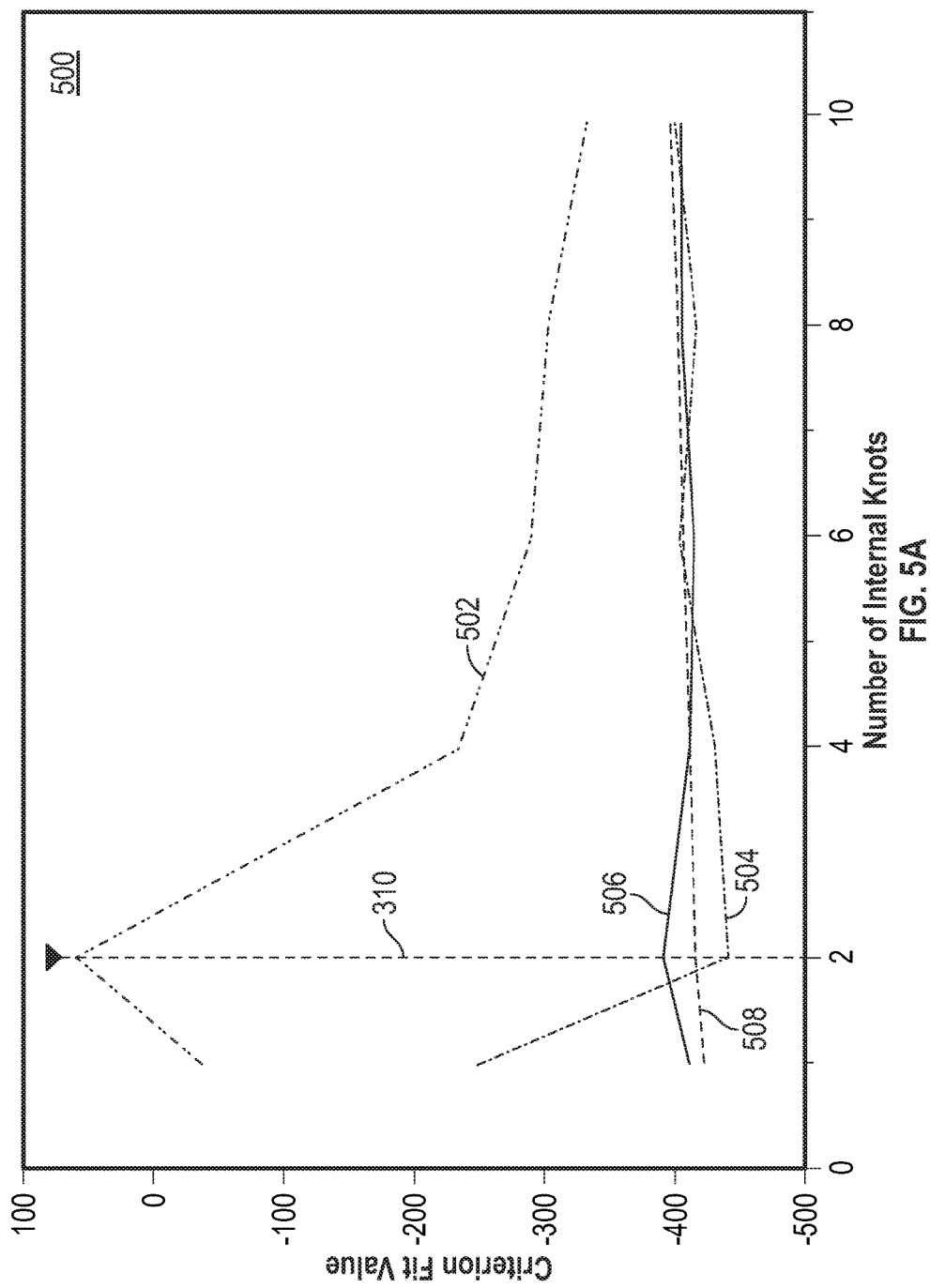
Figure 5B:
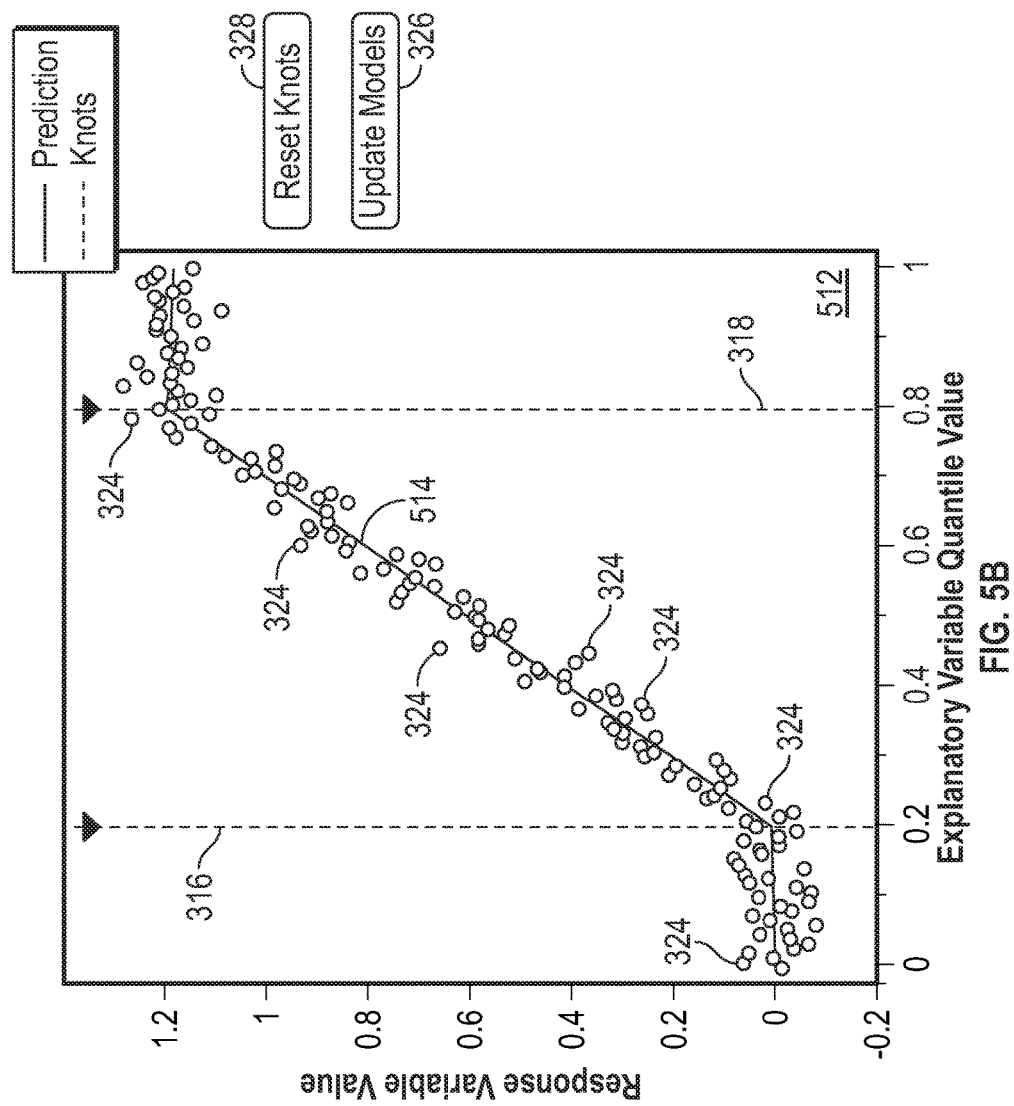

In operation 246, the one or more new locations of the internal knots is determined. For example, interactive b-spline model selection application 122 receives an indicator of a new quantile value location for first internal knot location line 316 and/or for second internal knot location line 318 to define the one or more new locations of the internal knots for the current number of knots $N_{CK}$. For example, referring to FIG. 5B, a third best fit b-spline model graph 512 is presented in the user interface window of interactive b-spline model selection application 122 on display 116 in response to moving first internal knot location line 316 to the first quantile value at 0.2 and second internal knot location line 318 to the second quantile value at 0.8.

In an operation 248, a current polynomial degree $N_{CD}$ is selected from the set of polynomial degrees $N_D$. For example, a first polynomial degree is selected from the set of polynomial degrees $N_D$.

In an operation 250, a b-spline model is fit to the response variable value and the quantile value computed for each explanatory variable value of each observation vector read from training dataset 124 using the current number of knots $N_{CK}$ and the current polynomial degree $N_{CD}$ and the B-spline type model. The internal knot locations are the one or more new locations of the internal knots for the current number of knots $N_{CK}$, the first external knot location at quantile level zero, and the last external knot location at quantile level one. The b-splines are piecewise polynomials defined based on the current polynomial degree $N_{CD}$ and that are continuous at each internal knot location.

In an operation 252, a criterion fit value is computed for the computed b-spline model based on the fit criterion method selected in operation 212. Coefficients that describe the computed b-spline model may be saved in computer-readable medium 108 in association with the current number of knots $N_{CK}$ and the current polynomial degree $N_{CD}$.

In an operation 254, coefficients that describe the computed b-spline model and the computed criterion fit value may be stored in computer-readable medium 108 in association with the current number of knots $N_{CK}$ and the current polynomial degree $N_{CD}$ and the one or more new locations of the internal knots.

In an operation 256, a determination is made concerning whether there is another polynomial degree of the set of polynomial degrees to evaluate. When there is another polynomial degree, processing continues in an operation 258. When there is not another polynomial degree, processing continues in an operation 260.

In operation 258, a next polynomial degree is selected from the set of polynomial degrees $N_D$ as the current polynomial degree $N_{CD}$, and processing continues in operation 250 to fit the b-spline model using the next polynomial degree.

In operation 260, the b-spline model having the best fit is determined from the stored criterion fit values. For example, a minimum criterion fit value may be identified from the stored criterion fit values for the current number of knots $N_{CK}$ with the one or more new locations of the internal knots, and the polynomial degree $N_{BFD}$ may be selected with the coefficients associated with the best fit b-spline model. Processing continues in operation 234 to update the criterion fit graph and the best fit b-spline model graph presented in display 116. For example, referring to FIG. 5A, a third criterion fit graph 500 is presented in the user interface window of interactive b-spline model selection application 122 on display 116. Third criterion fit graph 500 includes a curve defined for each polynomial degree of the set of polynomial degrees $N_D$ computed in operations 250 and 252 with the one or more new locations of the internal knots for the current number of knots $N_{CK}$. For example, for $N_D=\{0, 1, 2, 3\}$, a fifth curve 502 shows the criterion fit value as a function of the number of internal knots for $N_D=0$; a sixth curve 604 shows the criterion fit value as a function of the number of internal knots for $N_D=1$; a seventh curve 506 shows the criterion fit value as a function of the number of internal knots for $N_D=2$; an eighth curve 508 shows the criterion fit value as a function of the number of internal knots for $N_D=3$. The b-spline model having the best fit is provided by $N_D=1$ as indicated by sixth curve 604. Only the points of each curve 502, 504, 506, 508 computed for $N_{CK}=2$ have been updated because they are the only values that have changed. Processing continues in operation 236 to also update the best fit b-spline model graph presented in display 116. For example, referring again to FIG. 5B, a third best fit model curve 514 is a plot of the response variable value as a function of the explanatory variable quantile value using the one or more new locations of the internal knots for the current number of knots $N_{CK}$, the best fit polynomial degree $N_D=1$, and the coefficients that describe the best fit b-spline model for $N_{CK}=2$ and $N_D=1$.

Referring to FIG. 2C, in operation 262, a determination is made concerning whether reset knots button 328 is selected by the user to reset the b-spline models based on the evenly spaced quantiles determined based on the current number of knots $N_{CK}$. When reset knots button 328 is selected, processing continues in an operation 264. When reset knots button 328 is not selected, processing continues in an operation 266. For example, interactive b-spline model selection application 122 receives an indicator that the user has selected reset knots button 328.

In operation 264, the evenly spaced quantile knot location(s) are determined based on the current number of knots $N_{CK}$, and processing continues in operation 248 to update the b-spline models and the associated graphs.

In operation 266, a determination is made concerning whether the user has indicated to store the current best fit b-spline model to b-spline model description 126. When the user has indicated to store the current best fit b-spline model, processing continues in an operation 268. When the user has not indicated to store the current best fit b-spline model, processing continues in operation 238 to determine a response to a next user interaction with interactive b-spline model selection application 122. For example, interactive b-spline model selection application 122 receives an indicator that the user has selected a save or store button or menu item.

In operation 268, the coefficients for the current best fit b-spline model, the current number of knots $N_{CK}$, $N_{BFD}$, and the one or more current locations of the internal knots are written to and stored in model description 126, and processing is stopped. An error value and/or a residual value may be computed between results generated using the current best fit b-spline model and the values read from training dataset 124. The computed error value and/or a residual value also may be written to and stored in model description 126. A log-likelihood for computing the AIC, the BIC, etc. also may be stored.

Interactive b-spline model selection application 122 allows the user to interactively adjust the number of internal knots and their locations to interactively determine a best fit b-spline model that is otherwise difficult to identify through adaptive procedures or is difficult to quickly identify due to the very large set of parameters needed to evaluate that makes the determination computationally very expensive. The process is automatically initiated to provide the user with an initial evaluation based on evenly spaced quantile locations for the internal knot locations. After adjusting the number of knots and/or their locations, the user receives immediate feedback on the result of their selection. Additionally, the overlay of the data points assists the user in visually identifying potentially better knot locations. As a result, interactive b-spline model selection application 122 allows the user to control the process by which the best model is defined and to use their expertise in selecting knot locations with fast updating and determination of a best polynomial degree for a selected number of knots and knot locations.

As stated previously, interactive b-spline model selection application 122 is easy to use and provides approximately instantaneous feedback so that the user can quickly and efficiently change a location of one or more knots interactively. Alternative solutions require the user to specify the exact locations of all knots, while Interactive b-spline model selection application 122 allows the user to easily change all or any subset of the default locations as needed.

Referring to FIG. 6, a block diagram of a prediction device 600 is shown in accordance with an illustrative embodiment. Prediction device 600 may include a second input interface 602, a second output interface 604, a second communication interface 606, a second non-transitory computer-readable medium 608, a second processor 610, a prediction application 622, b-spline model description 126, an input dataset 624, and predicted output dataset 626. Fewer, different, and/or additional components may be incorporated into prediction device 600. Prediction device 600 and b-spline model selection device 100 may be the same or different devices.

Second input interface 602 provides the same or similar functionality as that described with reference to input interface 102 of b-spline model selection device 100 though referring to prediction device 600. Second output interface 604 provides the same or similar functionality as that described with reference to output interface 104 of b-spline model selection device 100 though referring to prediction device 600. Second communication interface 606 provides the same or similar functionality as that described with reference to communication interface 106 of b-spline model selection device 100 though referring to prediction device 600. Data and messages may be transferred between prediction device 600 and distributed computing system 128 using second communication interface 606. Second computer-readable medium 608 provides the same or similar functionality as that described with reference to computer-readable medium 108 of b-spline model selection device 100 though referring to prediction device 600. Second processor 610 provides the same or similar functionality as that described with reference to processor 110 of b-spline model selection device 100 though referring to prediction device 600.

Prediction application 622 performs operations associated with predicting values for response variable Y using b-spline model description 126 based on values for the explanatory variable X stored in input dataset 624. Dependent on the type of data stored in training dataset 124 and input dataset 624, prediction application 622 may identify anomalies as part of process control, for example, of a manufacturing process, for machine condition monitoring, for example, an electro-cardiogram device, etc. Some or all of the operations described herein may be embodied in prediction application 622. The operations may be implemented using hardware, firmware, software, or any combination of these methods.

Figure 7:
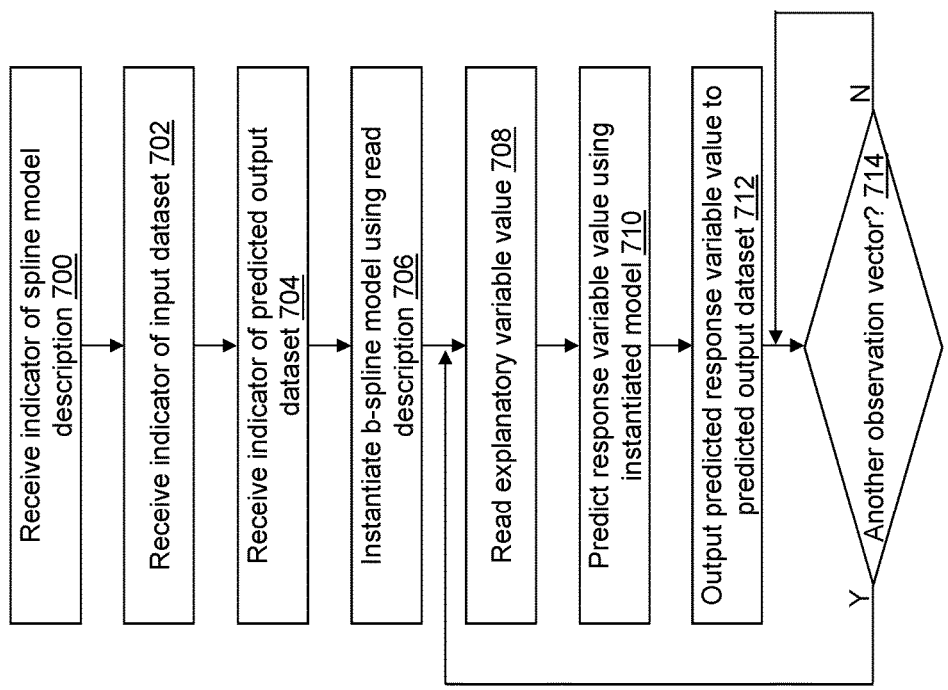
FIG. 7 depicts a flow diagram illustrating examples of operations performed by the prediction device of FIG. 6 in accordance with an illustrative embodiment.

Referring to the example embodiment of FIG. 7, prediction application 622 is implemented in software (comprised of computer-readable and/or computer-executable instructions) stored in second computer-readable medium 608 and accessible by second processor 610 for execution of the instructions that embody the operations of prediction application 622. Prediction application 622 may be written using one or more programming languages, assembly languages, scripting languages, etc. Prediction application 622 may be integrated with other analytic tools. For example, prediction application 622 may be implemented using or integrated with one or more SAS software tools such as JMP®, Base SAS, SAS/STAT®, of SAS® Enterprise Miner™ SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, all of which are developed and provided by SAS Institute Inc. of Cary, N.C., USA. One or more operations of prediction application 622 further may be performed by an ESPE. Prediction application 622 and interactive b-spline model selection application 122 further may be integrated applications.

Prediction application 622 may be implemented as a Web application. Prediction application 622 may be integrated with other system processing tools to automatically process data generated as part of operation of an enterprise using second input interface 602, second output interface 604, and/or second communication interface 606 so that appropriate action can be initiated in response. For example, a warning or an alert may be presented using a second display 616, a second speaker 618, a second printer 620, etc. or sent to one or more computer-readable media, display, speaker, printer, etc. of distributed computing system 128 based on predicted values for response variable Y.

Training dataset 124 and input dataset 624 may be generated, stored, and accessed using the same or different mechanisms. Similar to training dataset 124, input dataset 624 may include a plurality of rows and a plurality of columns with the plurality of rows referred to as observation vectors or records, and the columns referred to as variables that are associated with an observation. Input dataset 624 may be transposed.

Similar to training dataset 124, input dataset 624 may be stored on second computer-readable medium 608 or on one or more computer-readable media of distributed computing system 128 and accessed by prediction device 600 using second communication interface 606. Data stored in input dataset 624 may be a sensor measurement or a data communication value, for example, from a sensor 613, may be generated or captured in response to occurrence of an event or a transaction, generated by a device such as in response to an interaction by a user with the device, for example, from a second keyboard 612 or a second mouse 614, etc. The data stored in input dataset 624 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in input dataset 624 may be captured at different time points periodically, intermittently, when an event occurs, etc. One or more columns may include a time value. Similar to training dataset 124, data stored in input dataset 624 may be generated as part of the IoT, and some or all data may be pre- or post-processed by an ESPE.

Similar to training dataset 124, input dataset 624 may be stored in various compressed formats such as a coordinate format, a compressed sparse column format, a compressed sparse row format, etc. Input dataset 624 further may be stored using various structures as known to those skilled in the art including a file system, a relational database, a system of tables, a structured query language database, etc. on b-spline model selection device 100, on prediction device 600, and/or on distributed computing system 128. Prediction device 600 and/or distributed computing system 128 may coordinate access to input dataset 624 that is distributed across a plurality of computing devices. For example, input dataset 624 may be stored in a cube distributed across a grid of computers as understood by a person of skill in the art. As another example, input dataset 624 may be stored in a multi-node Hadoop® cluster. As another example, input dataset 624 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in input dataset 624.

Referring to FIG. 7, example operations of prediction application 622 are described. Additional, fewer, or different operations may be performed depending on the embodiment of prediction application 622. The order of presentation of the operations of FIG. 7 is not intended to be limiting.

Although some of the operational flows are presented in sequence, the various operations may be performed in various repetitions, concurrently (in parallel, for example, using threads and/or a distributed computing system), and/or in other orders than those that are illustrated.

In an operation 700, a seventh indicator may be received that indicates b-spline model description 126. For example, the seventh indicator indicates a location and a name of b-spline model description 126. As an example, the seventh indicator may be received by prediction application 622 after selection from a user interface window or after entry by a user into a user interface window. In an alternative embodiment, b-spline model description 126 may not be selectable. For example, a most recently created b-spline model description may be used automatically.

In an operation 702, an eighth indicator may be received that indicates input dataset 624. For example, the eighth indicator indicates a location and a name of input dataset 624. As an example, the eighth indicator may be received by prediction application 622 after selection from a user interface window or after entry by a user into a user interface window. In an alternative embodiment, input dataset 624 may not be selectable. For example, a most recently created dataset may be used automatically.

In an operation 704, a ninth indicator may be received that indicates predicted output dataset 626. For example, the ninth indicator indicates a location and a name of predicted output dataset 626. As an example, the ninth indicator may be received by prediction application 622 after selection from a user interface window or after entry by a user into a user interface window. In an alternative embodiment, predicted output dataset 626 may not be selectable. For example, a default name and location for predicted output dataset 626 may be used automatically.

In an operation 706, a b-spline model is instantiated based on the b-spline model description read from b-spline model description 126. For example, the coefficients for the polynomial defined by the selected polynomial degree using the selected number of knots and their locations is instantiated.

In an operation 708, a value x for the explanatory variable X is read from a next line of input dataset 624 or optionally is received from an ESPE.

In an operation 710, a value y for the response variable Y is predicted using the instantiated b-spline model and the read value x.

In an operation 712, the predicted value y for the response variable Y is output to predicted output dataset 626. The value x and/or other values read from input dataset further may be output to predicted output dataset 626.

In an operation 714, a determination is made concerning whether there is another observation vector to process. When there is another observation vector to process, processing continues in operation 708. When there is not another observation vector to process, processing continues in operation 714 to wait for receipt of another observation vector, for example, from an ESPE, or processing is done.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   read a dataset that includes a plurality of observation vectors, wherein each observation vector of the plurality of observation vectors includes an explanatory variable value and a response variable value;
   define a first knot location and a last knot location;
   for each number of internal knots value of a set of internal knot values,
      define a knot location for each internal knot of the respective number of internal knots value;
      for each polynomial degree value of a set of polynomial degree values,
         fit a b-spline type model using the first knot location, the last knot location, and the defined knot locations and the respective polynomial degree value, wherein the b-spline type model is further fit to the explanatory variable value and the response variable value of each observation vector of the plurality of observation vectors to define coefficients that describe a response variable;
         compute a fit criterion value for the fit b-spline type model that quantifies a goodness of the fit; and
         store the computed fit criterion value, the first knot location, the last knot location, the defined knot locations, the respective polynomial degree value, the respective number of internal knots value, and the defined coefficients to the computer-readable medium;
   determine a best fit b-spline model based on the stored, computed fit criterion value of each fit b-spline type model;
   present a criterion fit graph on a display, wherein the criterion fit graph includes a number of internal knots line that indicates the number of internal knots value of the determined best fit b-spline model and a polynomial degree curve for each polynomial degree value of the set of polynomial degree values, wherein each polynomial degree curve shows the stored, computed fit criterion value as a function of the set of internal knot values;
   present a best fit b-spline model graph on the display next to the presented criterion fit graph, wherein the best fit b-spline model graph includes a knot location line at each of the knot locations defined for the number of internal knots value of the determined best fit b-spline model and a best fit model curve that is a plot of the response variable value computed as a function of the explanatory variable value using the defined coefficients of the determined best fit b-spline model;
   receive an indicator that the number of internal knots line is moved to a different number of internal knots value;

redefine the knot location for each internal knot based on the different number of internal knots value;

determine a second best fit b-spline model based on the stored, computed fit criterion value having the different number of internal knots value for the respective number of internal knots value; and update the presented best fit b-spline model graph to show the knot location line at each of the redefined knot locations and a second best fit model curve that is a second plot of the explanatory variable value computed as a function of the response variable value using the defined coefficients of the determined second best fit b-spline model.

2. The non-transitory computer-readable medium of claim 1, wherein the fit criterion value is computed for the fit b-spline type model using a predefined fit criterion method.

3. The non-transitory computer-readable medium of claim 2, wherein the fit criterion method is predefined as a user input through a user interface.

4. The non-transitory computer-readable medium of claim 3, wherein the predefined fit criterion method is selected from the group consisting of a Bayesian information criterion method, an Akaike information criterion method, a generalized cross-validation information criterion method, a robust generalized cross-validation information criterion method, and a corrected Akaike information criterion method.

5. The non-transitory computer-readable medium of claim 1, wherein the set of internal knot values is received as a user input through a user interface.

6. The non-transitory computer-readable medium of claim 1, wherein the set of polynomial degree values is received as a user input through a user interface.

7. The non-transitory computer-readable medium of claim 1, wherein the knot location for each internal knot of the respective number of internal knots value is defined as an evenly spaced quantile value between zero and one based on the respective number of internal knots value.

8. The non-transitory computer-readable medium of claim 7, wherein the first knot location is at zero and the last knot location is at one.

9. The non-transitory computer-readable medium of claim 1, wherein the knot location for each internal knot of the respective number of internal knots value is defined from evenly spaced values computed for the explanatory variable values based on the respective number of internal knots value.

10. The non-transitory computer-readable medium of claim 9, wherein the first knot location is at a minimum value of the explanatory variable values and the last knot location is at a maximum value of the explanatory variable values.

11. The non-transitory computer-readable medium of claim 1, wherein the explanatory variable value is a quantile value computed for each explanatory variable value, wherein the quantile value is computed for each explanatory variable value before defining the knot location for each internal knot of the respective number of internal knots value.

12. The non-transitory computer-readable medium of claim 1, wherein the number of internal knots line is moved by sliding the number of internal knots line left or right along an x-axis of the presented criterion fit graph that is defined by the set of internal knot values.

13. The non-transitory computer-readable medium of claim 12, wherein the indicator is received after the computer-readable instructions further cause the computing device to detect a selection of the number of internal knots line, a movement of the number of internal knots line, and a drop of the number of internal knots line at the different number of internal knots value on the x-axis.

14. The non-transitory computer-readable medium of claim 1, wherein the best fit b-spline model graph further includes a scatterplot of the response variable value read from the dataset and the explanatory variable value.

15. The non-transitory computer-readable medium of claim 1, wherein the computer-readable instructions further cause the computing device to store the defined coefficients of the second best fit b-spline model and the redefined knot locations of the second best fit b-spline model to the computer-readable medium.

16. The non-transitory computer-readable medium of claim 15, wherein parameters of the second best fit b-spline model are stored when a store indicator is received.

17. The non-transitory computer-readable medium of claim 15, wherein the computer-readable instructions further cause the computing device to:

read a second explanatory variable value from a scoring dataset;

compute a new response variable value using the stored, defined coefficients and the redefined knot locations of the second best fit b-spline model; and output the computed new response variable value.

18. The non-transitory computer-readable medium of claim 1, wherein the computer-readable instructions further cause the computing device to:

receive a second indicator that at least one knot location line is moved to a different knot location;

determine the different knot location of the at least one knot location line;

redefine a second knot location for each internal knot of the respective number of internal knots value including the determined different knot location;

for each polynomial degree value of the set of polynomial degree values, refit the b-spline type model using the first knot location, the last knot location, and the redefined second knot locations and the respective polynomial degree value to define second coefficients that describe the response variable;

compute a second fit criterion value for the refit b-spline type model; and store the computed second fit criterion value, the first knot location, the last knot location, the redefined second knot locations, the respective polynomial degree value, the respective number of internal knots value, and the defined second coefficients to the computer-readable medium;

determine a third best fit b-spline model based on the stored, computed second fit criterion value of each refit b-spline type model; and update the presented best fit b-spline model graph to show the knot location line at each of the redefined second knot locations and a third best fit model curve that is a third plot of the explanatory variable value computed as a function of the response variable value using the defined second coefficients of the determined third best fit b-spline model.

19. The non-transitory computer-readable medium of claim 18, wherein the computer-readable instructions further cause the computing device to update the presented criterion fit graph to show a second polynomial degree curve for each polynomial degree value of the set of polynomial degree values, wherein each polynomial degree curve shows the stored, computed second fit criterion value as a function of the set of internal knot values.

20. The non-transitory computer-readable medium of claim 18, wherein the computer-readable instructions further cause the computing device to store the second coefficients of the determined third best fit b-spline model and the redefined second knot locations to the computer-readable medium.

21. The non-transitory computer-readable medium of claim 20, wherein parameters of the third best fit b-spline model are stored when a store indicator is received.

22. The non-transitory computer-readable medium of claim 20, wherein the computer-readable instructions further cause the computing device to:
    read a second explanatory variable value from a scoring dataset;
    compute a new response variable value using the stored, second coefficients of the determined third best fit b-spline model and the redefined second knot locations; and
    output the computed new response variable value.

23. A computing device comprising:
    a processor; and
    a non-transitory computer-readable medium operably coupled to the processor, the computer-readable medium having computer-readable instructions stored thereon that, when executed by the processor, cause the computing device to
        read a dataset that includes a plurality of observation vectors, wherein each observation vector of the plurality of observation vectors includes an explanatory variable value and a response variable value;
        define a first knot location and a last knot location;
        for each number of internal knots value of a set of internal knot values,
            define a knot location for each internal knot of the respective number of internal knots value;
            for each polynomial degree value of a set of polynomial degree values,
                fit a b-spline type model using the first knot location, the last knot location, and the defined knot locations and the respective polynomial degree value, wherein the b-spline type model is further fit to the explanatory variable value and the response variable value of each observation vector of the plurality of observation vectors to define coefficients that describe a response variable;
                compute a fit criterion value for the fit b-spline type model that quantifies a goodness of the fit; and
                store the computed fit criterion value, the first knot location, the last knot location, the defined knot locations, the respective polynomial degree value, the respective number of internal knots value, and the defined coefficients to the computer-readable medium;
        determine a best fit b-spline model based on the stored, computed fit criterion value of each fit b-spline type model;
        present a criterion fit graph on a display, wherein the criterion fit graph includes a number of internal knots line that indicates the number of internal knots value of the determined best fit b-spline model and a polynomial degree curve for each polynomial degree value of the set of polynomial degree values, wherein each polynomial degree curve shows the stored, computed fit criterion value as a function of the set of internal knot values;
        present a best fit b-spline model graph on the display next to the presented criterion fit graph, wherein the best fit b-spline model graph includes a knot location line at each of the knot locations defined for the number of internal knots value of the determined best fit b-spline model and a best fit model curve that is a plot of the response variable value computed as a function of the explanatory variable value using the defined coefficients of the determined best fit b-spline model;
        receive an indicator that the number of internal knots line is moved to a different number of internal knots value;
        redefine the knot location for each internal knot based on the different number of internal knots value;
        determine a second best fit b-spline model based on the stored, computed fit criterion value having the different number of internal knots value for the respective number of internal knots value; and
        update the presented best fit b-spline model graph to show the knot location line at each of the redefined knot locations and a second best fit model curve that is a second plot of the explanatory variable value computed as a function of the response variable value using the defined coefficients of the determined second best fit b-spline model.

24. A method of providing interactive b-spline model selection, the method comprising:
    reading, by a computing device, a dataset that includes a plurality of observation vectors, wherein each observation vector of the plurality of observation vectors includes an explanatory variable value and a response variable value;
    defining, by the computing device, a first knot location and a last knot location;
    for each number of internal knots value of a set of internal knot values,
        defining, by the computing device, a knot location for each internal knot of the respective number of internal knots value;
        for each polynomial degree value of a set of polynomial degree values,
            fitting, by the computing device, a b-spline type model using the first knot location, the last knot location, and the defined knot locations and the respective polynomial degree value, wherein the b-spline type model is further fit to the explanatory variable value and the response variable value of each observation vector of the plurality of observation vectors to define coefficients that describe a response variable;
            computing, by the computing device, a fit criterion value for the fit b-spline type model that quantifies a goodness of the fit; and
            storing, by the computing device, the computed fit criterion value, the first knot location, the last knot location, the defined knot locations, the respective polynomial degree value, the respective number of internal knots value, and the defined coefficients to the computer-readable medium;
    determining, by the computing device, a best fit b-spline model based on the stored, computed fit criterion value of each fit b-spline type model;
    presenting, by the computing device, a criterion fit graph on a display, wherein the criterion fit graph includes a number of internal knots line that indicates the number of internal knots value of the determined best fit b-spline model and a polynomial degree curve for each polynomial degree value of the set of polynomial degree values, wherein each polynomial degree curve shows the stored, computed fit criterion value as a function of the set of internal knot values;

presenting, by the computing device, a best fit b-spline model graph on the display next to the presented criterion fit graph, wherein the best fit b-spline model graph includes a knot location line at each of the knot locations defined for the number of internal knots value of the determined best fit b-spline model and a best fit model curve that is a plot of the response variable value computed as a function of the explanatory variable value using the defined coefficients of the determined best fit b-spline model;

receiving, by the computing device, an indicator that the number of internal knots line is moved to a different number of internal knots value;

redefining, by the computing device, the knot location for each internal knot based on the different number of internal knots value;

determining, by the computing device, a second best fit b-spline model based on the stored, computed fit criterion value having the different number of internal knots value for the respective number of internal knots value; and updating, by the computing device, the presented best fit b-spline model graph to show the knot location line at each of the redefined knot locations and a second best fit model curve that is a second plot of the explanatory variable value computed as a function of the response variable value using the defined coefficients of the determined second best fit b-spline model.

25. The method of claim 24, wherein the knot location for each internal knot of the respective number of internal knots value is defined as an evenly spaced quantile value between zero and one based on the respective number of internal knots value.

26. The method of claim 24, wherein the knot location for each internal knot of the respective number of internal knots value is defined from evenly spaced values computed for the explanatory variable values based on the respective number of internal knots value.

27. The method of claim 24, further comprising:
receive a second indicator that at least one knot location line is moved to a different knot location;
determining, by the computing device, the different knot location of the at least one knot location line;
redefining, by the computing device, a second knot location for each internal knot of the respective number of internal knots value including the determined different knot location;
for each polynomial degree value of the set of polynomial degree values,
refitting, by the computing device, the b-spline type model using the first knot location, the last knot location, and the redefined second knot locations and the respective polynomial degree value to define second coefficients that describe the response variable;
computing, by the computing device, a second fit criterion value for the refit b-spline type model; and
storing, by the computing device, the computed second fit criterion value, the first knot location, the last knot location, the redefined second knot locations, the respective polynomial degree value, the respective number of internal knots value, and the defined second coefficients to the computer-readable medium;
determining, by the computing device, a third best fit b-spline model based on the stored, computed second fit criterion value of each refit b-spline type model; and
updating, by the computing device, the presented best fit b-spline model graph to show the knot location line at each of the redefined second knot locations and a third best fit model curve that is a third plot of the explanatory variable value computed as a function of the response variable value using the defined second coefficients of the determined third best fit b-spline model.

28. The method of claim 27, further comprising updating, by the computing device, the presented criterion fit graph to show a second polynomial degree curve for each polynomial degree value of the set of polynomial degree values, wherein each polynomial degree curve shows the stored, computed second fit criterion value as a function of the set of internal knot values.

29. The method of claim 27, further comprising storing, by the computing device, the second coefficients of the determined third best fit b-spline model and the redefined second knot locations to the computer-readable medium.

30. The method of claim 29, wherein parameters of the third best fit b-spline model are stored when a store indicator is received.

* * * * *

UNITED STATES PATENT AND TRADEMARK OFFICE
CERTIFICATE OF CORRECTION

PATENT NO. : 9,996,952 B1
APPLICATION NO. : 15/890841
DATED : June 12, 2018
INVENTOR(S) : Ryan Jeremy Parker It is certified that error appears in the above-identified patent and that said Letters Patent is hereby corrected as shown below:

In the Specification

Column 11, Lines 38-40:
Delete the sentence "The user interface window further includes an update models button 326 and a reset knobs button 328 described below." and replace with -- The user interface window further includes an update models button 326 and a reset knots button 328 described below. --

Column 11, Lines 44-45:
Delete the phrase "and/or may select update models button 326 or reset knobs button 328" and replace with -- and/or may select update models button 326 or reset knots button 328 --

Signed and Sealed this
Eleventh Day of December, 2018

Andrei Iancu
*Director of the United States Patent and Trademark Office*